No. 816,745. PATENTED APR. 3, 1906.
F. ROWLEY.
VEHICLE FOR CRIPPLES.
APPLICATION FILED AUG. 18, 1905.
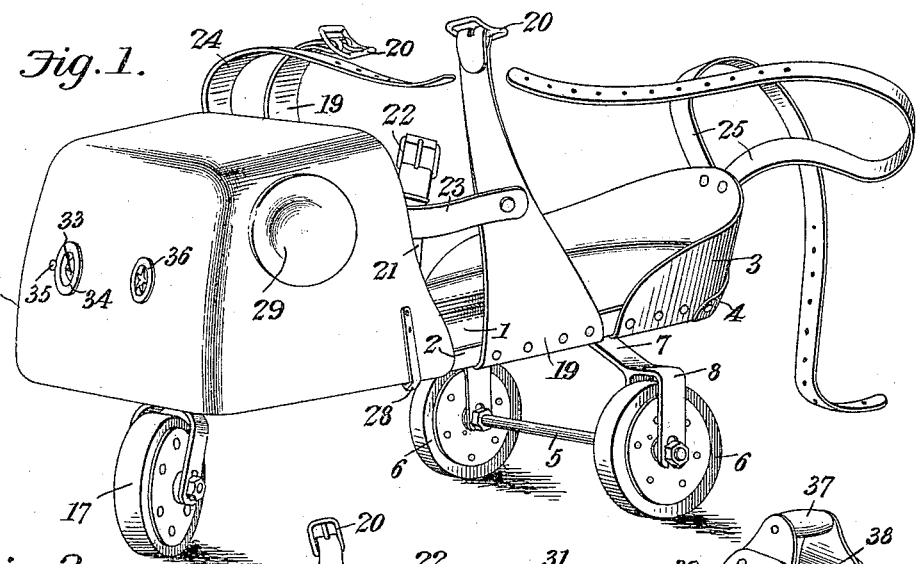
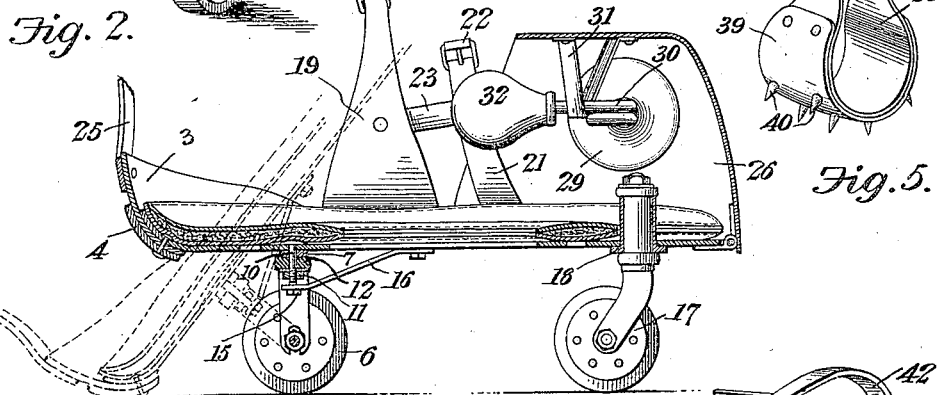
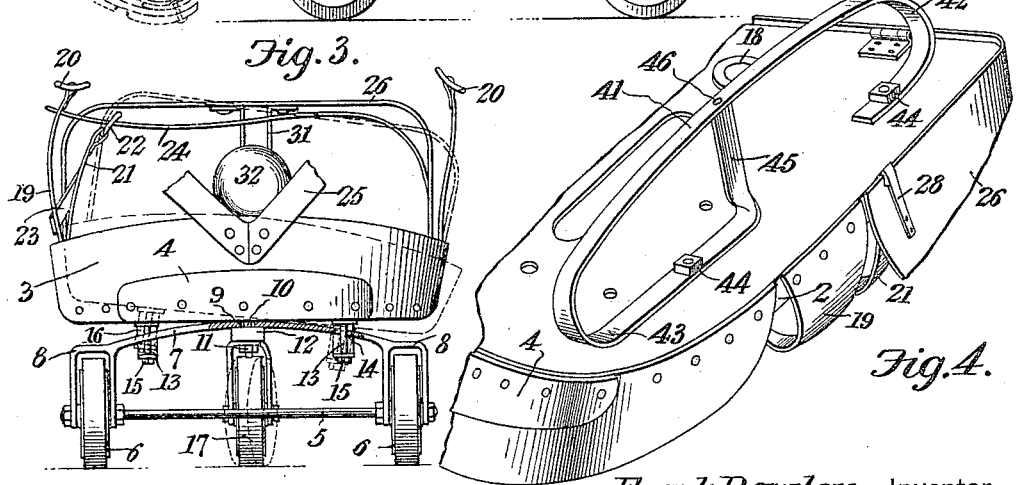
Witnesses
Frank Rowley Inventor
by C. A. Snow & Co.
Attorneys

UNITED STATES PATENT OFFICE.

FRANK ROWLEY, OF BATTLE CREEK, MICHIGAN.

VEHICLE FOR CRIPPLES.

No. 816,745.  Specification of Letters Patent.  Patented April 3, 1906.

Application filed August 18, 1905. Serial No. 274,775.

*To all whom it may concern:*

Be it known that I, FRANK ROWLEY, a citizen of the United States, residing at Battle Creek, in the county of Calhoun and State of Michigan, have invented a new and useful Vehicle for Cripples, of which the following is a specification.

This invention relates to vehicles or chairs for cripples, and it is proposed to arrange the same so as to give access to the ground or floor on the part of the hands of the occupant for convenience in propelling and manipulating the device.

It is also designed to enable the convenient steering of the chair or vehicle by swaying movements of the occupant from side to side.

Another object of the invention is to enable the rearward tilting of the device to bring the rear end of the body into engagement with the ground to operate as an emergency-brake for quickly stopping the device to avoid collisions and the like.

A still further object of the invention is the provision of a boot for inclosing and protecting the thighs of the occupant and to operate as a case or container for carrying any desired article, it being designed to equip the boot with a signal-horn and a flashlight.

It is also designed to enable the substitution of runners for the wheels to enable the use of the device upon snow and ice.

With these and other objects in view the present invention consists in the combination and arrangement of parts as will be hereinafter more fully described, shown in the accompanying drawings, and particularly pointed out in the appended claims, it being understood that changes in the form, proportion, size, and minor details may be made within the scope of the claims without departing from the spirit or sacrificing any of the advantages of the invention.

In the accompanying drawings, Figure 1 is a perspective view of the chair or vehicle of the present invention. Fig. 2 is a longitudinal sectional view thereof, a backward-tilted position of the device being shown in dotted lines to illustrate the manner of applying the emergency-brake. Fig. 3 is a rear view of the device. Fig. 4 is a fragmentary inverted perspective view showing the device provided with a runner. Fig. 5 is a detail perspective view of one of the pusher members.

Like characters of reference designate corresponding parts in each and every figure of the drawings.

The chair or vehicle of the present invention includes a seat made up of a base 1, having opposite longitudinal side flanges 2 and a back flange 3, the exterior of the latter being provided with a reinforcement 4, preferably a heavy strip of leather.

For the support of the rear end portion of the seat there is a wheeled axle 5, equipped at each end with a wheel 6, having a rubber tire and provided with a ball-bearing upon the axle to enable the easy and noiseless running of the wheel. This axle is carried by an upwardly-bowed or arcuate spring bar or bolster 7, which is provided at each end with a pendent yoke or fork 8, straddling the adjacent wheel and receiving the axle. The center of the spring-bolster is provided with an opening 9, through which depends a stud or pin 10, having a nut or head 11 upon its lower end and an elastic washer 12 interposed between the nut and the under side of the bolster, whereby the latter may rock vertically upon the pin 10 as a center, or, to be more correct, the body of the chair or vehicle is capable of tilting laterally upon the bolster. To prevent oscillation of the bolster from front to rear upon the pin 10, a pair of pins or projections 13 depend from the bottom of the seat or chair and pass through openings 14 in the bolster, there being a nut or head 15 provided upon the lower end of each guard-pin. Braces 16 are rigidly connected to the under side of the seat or chair in front of the axle and extend downwardly and rearwardly to the respective guard-pins, so as to prevent bending and breaking of the same under the stress of the bolster.

At the front of the seat or chair there is a caster-wheel 17, which has its stem rotatably piercing the bottom of the chair and contained within a tubular bearing 18, rigidly secured to the chair.

The present device is designed primarily for the use of cripples who have lost their legs above the knees thereof, and therefore the chair or seat is shaped and proportioned to receive the thighs of the occupant, it being proposed to connect the device to the thighs in the following manner: Secured to each longitudinal side flange slightly in rear of the middle of the chair is an upstanding leather strap 19, riveted or otherwise secured to the flange with its lower end portion comparatively broad, from which it tapers upwardly and is provided at its upper end with a suitable buckle 20. Just in front of one of the straps 19 there is another strap 21, which is shorter than the strap 19 and is provided with a buckle 22, there being a brace-strap 23 extending between the two straps 19 and 21. Upon the opposite side of the device and corresponding to the strap 21 is a longer strap 24, designed to be passed over the top of the device and across the thighs of the occupant and engaged with the buckle 22. A pair of straps 25 are secured to the back of the back flange 3 and are designed to be passed around the hips of the body and cross in front thereof for connection with the respective diagonally opposite buckles 20, whereby the chair is connected to the thighs and body of the occupant and the latter is held against forward and lateral displacement from the seat or chair.

The front of the chair is provided with a boot 26, arching over the top of the chair and formed of sheet metal, which is externally plated, japanned, upholstered, or otherwise ornamented. If desired, the hood may consist of a metal frame covered with leather or other suitable material in lieu of sheet metal. By preference, this boot is hinged to the front extremity of the chair and normally held in its closed position by means of a spring-catch 28, provided at each side of the boot and designed to snap beneath the under side of the boot, as plainly indicated in Figs. 1 and 4 of the drawings. By releasing the spring-catches the boot may be swung forwardly to expose the upper front portion of the chair or seat whenever it is desired to have access thereto. Besides forming a shield for the thighs of the occupant the boot 26 constitutes a receptacle for containing any useful articles—such, for instance, as a rain-coat, a squirt-gun for protecting the person against dogs, and any other desired article. It is also proposed to equip the boot with a signal-horn, the bell 29 of which pierces one side of the boot and has its tubular neck portion 30 supported in a suitable hanger 31, depending from the top of the boot, there being the usual compressible bulb 32, carried by the neck and disposed in such a position as to be received between the thighs of the occupant for the purpose of compressing the bulb to sound the horn without requiring the manipulation thereof by hand. In addition to the horn it is proposed to equip the hood with an electric flashlight, which has been indicated at 33, the bulb of which is exposed through an opening 34 in the front of the boot, the turn-button 35 of the lamp being projected through the front of the boot in convenient reach of the occupant of the chair. There is also an ornamental plate 36 provided upon the front of the boot and designed to receive any suitable data—such, for instance, as the number and date of the patent under which the device is manufactured, the name of the owner of the device, or any other suitable inscription.

In practice the occupant seats himself upon the chair and buckles the straps around his body and across his thighs, whereupon he can propel himself forwardly and backwardly by pushing with his hands upon the ground. For the protection of each hand there is a pusher in the form of a stirrup and including a substantially cylindrical hand-grasp 37 and a yoke or substantially U-shaped metallic body 38, between the ends of which the hand-grasp 37 is secured, the outer convexed side of the body being faced with a leather strip 39, and, if desired, the convexed face of the body may be provided with spurs 40, particularly adapted for use upon snow and ice. The device is propelled by a step-by-step movement of the hands, and it may be run forwardly or backwardly, as desired. By swaying the body to either side the chair may be tilted, as indicated by dotted lines in Fig. 3 of the drawings, whereby the caster-wheel 17 will be automatically turned, and the chair thereby effectually steered without requiring any manipulation on the part of the hands of the occupant.

As the occupant of the chair is enabled to place his hands upon the ground or floor, he can readily lift himself and the entire device upon his hands as a support, and is thereby enabled to pass up and down stairways, the curbings of pavements, and the like in a very simple and expeditious manner.

The device may be tilted rearwardly, so as to travel upon the rear wheels only, and can be likewise tilted forwardly, so as to travel upon the front wheel, whereby the user of the device is enabled to travel across a board or other narrow support which is not wide enough to accommodate the rear wheels.

To avoid collisions and the like, the occupant may quickly tilt the device rearwardly by throwing his weight in a rearward direction, so as to bring the back of the chair into engagement with the ground, as indicated by the dotted-line position in Fig. 2 of the drawings, whereby an emergency-brake is produced for the purpose of quickly stopping the device.

It will here be explained that the reinforcing leather strip 4 is designed to take the wear incident to the application of the brake and of course may be replaced when worn.

To enable the use of the device upon snow and ice, it is proposed to provide for substituting the running-gear including wheels by a running-gear including runners, one of the runners being shown in Fig. 4 of the drawings, and consists of a flat runner-bar 41, having its ends rebent, as at 42 and 43, with said rebent ends connected to the under side of the chair or seat by suitable fastenings 44, it of course being understood that the chair or seat is provided with two sets of openings for the reception of the fastenings for two runners. One of the rebent ends is extended and disposed at substantially right angles to the seat or chair, so as to form a brace or standard 45, which is suitably connected to the top of the middle portion of the runner, as indicated at 46.

The emergency stop or brake feature is possible with runners as well as with wheels, as the device may be tilted rearwardly by throwing the weight of the body rearwardly to bring the rear end of the seat into contact with the roadway, so as to quickly stop the forward movement of the device.

From the foregoing description it will be noted that the present invention contemplates two forms of running-gear for the chair or vehicle, the form shown in Figs. 1 to 3, inclusive, comprising wheels or rollers, while that shown in Fig. 4 includes a runner for use upon snow and ice, and therefore I propose to use the term "running-gear" in the appended claims as including wheels and runners.

Having thus described the invention, what is claimed is—

1. A vehicle or chair for cripples consisting of a seat shaped to receive the thighs of the occupant, a running-gear for the seat, and means to fasten the seat to the thighs of the occupant, the seat being supported at a height to give access of the hands of the occupant to the roadway for propelling and manipulating the device, and the device capable of being tilted rearwardly to bring its rear end into contact with the roadway to form an emergency-stop.

2. A vehicle or chair for cripples consisting of a seat shaped to receive the thighs of the occupant, a running-gear supporting the seat at a height to give access of the hands of the occupant to the roadway for propelling and manipulating the device, means for connecting the seat to the occupant thereof, and a boot hinged to the front end of the seat.

3. A vehicle or chair for cripples consisting of a seat shaped to receive the thighs of the occupant, a running-gear supporting the seat at a height to give access of the hands of the occupant to the roadway for propelling and manipulating the device, means for connecting the seat to the occupant thereof, a boot hinged to the front end of the seat, and a catch to fasten the boot to the seat.

4. A vehicle or chair for cripples consisting of a seat shaped to receive the thighs of the occupant, a running-gear supporting the seat at a height to give access of the hands of the occupant to the roadway for propelling and manipulating the device, means for connecting the seat to the occupant thereof, a boot hinged to the front of the seat, and spring-catches carried by opposite sides of the boot and capable of snapping beneath the respective edges of the seat to secure the boot thereto.

5. A vehicle or chair for cripples consisting of a wheeled seat supported at a height to give access of the hands of the occupant to the roadway for propelling and manipulating the device, the seat capable of being laterally tilted upon the wheels by a swaying movement of the body of the occupant for steering the device, and means for securing the device to the occupant.

6. A vehicle or chair for cripples consisting of a seat, a caster-wheel, a pair of wheels upon which the seat is capable of being tilted laterally by swaying movements of the occupant to steer the device, the seat being supported at a height to give access of the hands of the occupant to the roadway for propelling and manipulating the device, and means for attaching the seat to the occupant.

7. A vehicle or chair for cripples consisting of a seat, a caster-wheel therefor, a bolster upon which the seat is capable of being laterally tilted, supporting-wheels carried by the bolster, the seat being supported at a height to give access of the hands of the occupant to the roadway for manipulating and propelling the device, and means to attach the seat to the occupant thereof.

8. A vehicle or chair for cripples consisting of a seat, a supporting caster-wheel therefor, a bolster upon which the seat is capable of tilting laterally, each end of the bolster being provided with a depending yoke, a supporting-wheel mounted within each yoke, the seat being supported at a height to give access of the hands of the occupant to the roadway for propelling and manipulating the device, and means to attach the device to an occupant.

9. A vehicle or chair for cripples consisting of a seat, a supporting caster-wheel therefor, a bolster upon which the seat is capable of tilting laterally, supporting-wheels carried by the bolster, guard members depending from the seat and passing loosely through openings in the bolster, the seat being supported at a height to give access of the hands of the occupant to the roadway for propelling and manipulating the device, and means for attaching the seat to the occupant thereof.

10. A vehicle or chair for cripples consisting of a seat, a supporting caster-wheel therefor, a bolster upon which the seat is capable of tilting laterally, supporting-wheels carried by the bolster, guards depending from the seat and passing loosely through openings in the bolster, braces extending between the guards and the seat, the seat being supported at a height to give access of the hands of the occupant to the roadway for propelling and manipulating the device, and means for attaching the device to the occupant thereof.

11. A vehicle or chair for cripples consisting of a seat, a supporting caster-wheel therefor, an upwardly-bowed bolster, a pin depending from the seat and passing loosely through a central opening in the bolster, a head upon the lower end portion of the pin, an elastic element between the head and the bolster, supporting-wheels carried by the opposite ends of the bolster, the seat capable of tilting laterally upon the bolster and supported at a height to give access of the hands of the occupant to the roadway for propelling and manipulating the device, and means for attaching the device to the occupant thereof.

12. A vehicle or chair for cripples consisting of a seat, a supporting caster-wheel for the front of the seat, an upwardly-bowed bolster at the rear of the seat with its ends provided with depending yokes, supporting-wheels mounted within the yokes, a pin depending from the seat and loosely piercing the middle of the bolster, a head upon the lower end portion of the pin, an elastic element between the head and the bolster, guards depending from the seat and passing loosely through the bolster, braces extending between the seat and the lower ends of the guards, the seat capable of tilting laterally upon the bolster for steering the device and supported at a height to give access of the hands of the occupant to the roadway for propelling and manipulating the device, and means for attaching the seat to the occupant thereof.

In testimony that I claim the foregoing as my own I have hereto affixed my signature in the presence of two witnesses.

FRANK ROWLEY.

Witnesses:
J. H. JOCHUM, Jr.,
F. J. MULVEY.